United States Patent Office 2,842,269
Patented July 8, 1958

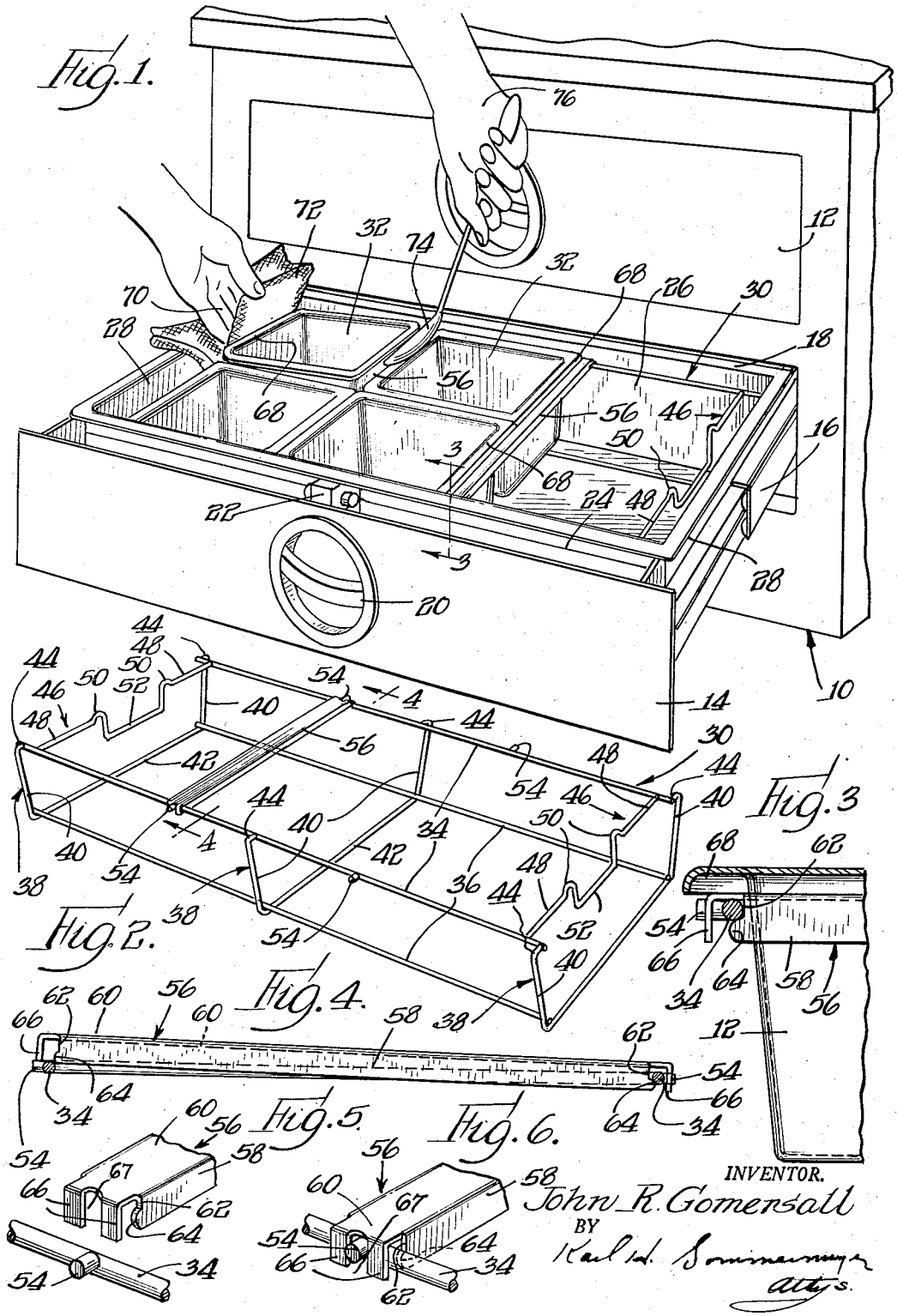

2,842,269
RACK FOR FOOD TRAYS

John R. Gomersall, Elgin, Ill., assignor to McGraw-Edison Company, a corporation of Delaware Application April 30, 1954, Serial No. 426,852

3 Claims. (Cl. 211—71)

This invention is concerned with food warmers, and particularly with an improved rack for supporting food trays in food warmers.

In kitchens where large quantities of food must be prepared at a time for dispensing in individual portions, it is common practice to utilize heated cabinets for maintaining trays or pans of cooked food at suitable serving temperatures. Food warmer cabinets generally incorporate a number of large and deep drawers in which the pans of food may be stored. In my copending application Serial No. 420,577, filing date April 2, 1954, and entitled "Rack For Food Pans," I have disclosed a wire rack for supporting one or more food pans of various sizes in a drawer with the edges of the tray or trays spaced from the walls of the drawer and readily accessible for removal from the drawer.

It is an object of this invention to provide an improved food tray or pan supporting rack and removable divider bars or auxiliary supports whereby a single rack may be utilized for supporting trays or pans of different sizes.

More specifically, it is an object of this invention to provide a food pan supporting rack in combination with dividers or auxiliary supports that can be snapped in place.

It is a further object of this invention to provide a wire rack for supporting food pans and the like, and a divider or auxiliary support wherein the resiliency of the wire rack is utilized to snap the divider in place.

A further object of this invention is to provide a rack for food trays wherein the fasteners for divider bars or auxiliary supports are covered by the flange of a pan.

Yet another object of this invention is to provide a rigid snap-in divider bar or auxiliary support for a food pan supporting rack.

Other and further objects and advantages of the present invention will be apparent from the ensuing description when taken in connection with the accompanying drawings wherein:

Fig. 1 is a perspective view illustrating my rack and divider bar in use in a food warmer cabinet;

Fig. 2 is a perspective view of the rack and divider;

Fig. 3 is a fragmentary vertical sectional view taken substantially along the line 3—3 of Fig. 1;

Fig. 4 is a vertical sectional view taken substantially along the line 4—4 in Fig. 2;

Fig. 5 is a fragmentary perspective view showing a divider bar about to be assembled with the rack; and Fig. 6 is a view similar to Fig. 5 following assembly.

Referring now more specifically to the drawings, there may be seen a food warmer cabinet 10 of any known or suitable construction and having a plurality of drawers 12 and 14 which are mounted for movement on suitable slide mechanism 16 into and out of openings 18 in the front of the cabinet. A handle 20 is provided on the front of each drawer for operating a latch mechanism 22. Each of the drawers, for instance the drawer 14, is provided with a storage compartment defined in part by a front wall 24, a rear wall 26, and a pair of side walls 28.

A rack 30 is placed in the drawer for supporting a plurality of pans 32 therein. The rack is made of wire members which preferably are of stainless steel and which comprise a pair of upper, elongated longitudinal members 34 and a pair of similar, lower longitudinal members 36. These members are mounted on transverse formers or separators 38, there being three of these formers or spaces in the illustrative embodiment. The spacers 38 are generally U-shaped, and are relatively wide and shallow, having slightly diverging legs and an interconnecting bight 42. The legs 40 are provided at their upper ends with inturned tips or fingers 44 to which the longitudinal members 34 are affixed by means such as welding or brazing. The lower pair of longitudinal members 36 is welded or brazed to the transverse separators at the junctions between the legs 40 and bights 42. The longitudinal members 34 and 36 thus are held in spaced apart parallelism with the longitudinal members 34 spaced above the bottom or floor of the drawer, and also spaced in from the outermost extremities of the legs 40, and hence away from the front and back of the drawer.

The rack 30 further has a pair of end pieces or rods 46 extending parallel to the bights 42 and welded or brazed at their ends to the upper longitudinal members 34, but spaced from the ends thereof. The end pieces 46 further include humps or inverted U-shaped portions 50 interconnecting the straight portions 48 and relatively wide and shallow U-shaped portions 52 for providing clearance for the fingers of a person handling the tray. The humps 50 serve to support trays in the vicinity of the finger clearance section as will be brought out more particularly hereinafter. The rack 30 is completed by a plurality of outward projecting lugs 54 on the upper longitudinal members 34 which may be welded or brazed in place. The lugs 54 occur in pairs for locating removable divider bars 56, one lug of each pair on each of the two rods 34, there being two such pairs in the illustrative example. The pairs of lugs are spaced so that the bars 56 suitably divide the space between the end members 46. In the specific example, the two end members 46 and two bars 56 provide three substantially equal spacers for holding standard size steam table pans. The rack may be used by itself as just described to support a single pan as described in my previously mentioned copending application. The rack further may be used with dividers or auxiliary supports for supporting a plurality of trays as mentioned in that application and as hereinafter more fully set forth.

The divider bars or auxiliary supports 56 are preferably made of stainless steel. Each is generally channel-shaped, having a pair of parallel side flanges 58 and an intermediate web 60. The flanges 58 are terminated short of the end of the web as at 62, and are provided with nubs or projections 64 substantially on their lower halves and extending beyond the terminations 62. The projections or nubs 64 comprise generally circular arcs, or are otherwise rounded off to provide camming edges as will be apparent shortly. These nubs or camming edges are spaced apart a distance slightly greater than the space between the opposite longitudinal members 34 for holding the dividers on the rack. The webs 60 are provided at each end with a pair of depending fingers 66 spaced apart a distance just slightly greater than the diameter of the lugs 54. The fingers 66 are spaced away from the foremost edges of the projections 64 a distance which may be very slightly less than the diameter of the longitudinal members, rods, or wires 34 and the opposite nubs or cams likewise may be spaced from the cooperating fingers 66 just slightly less than the diameter of the longitudinal members 34.

The wire rods 34 are of course resilient, and being slender will yield somewhat. Accordingly, when it is desired to install a divider bar or auxiliary support on the rack, the space or recess 67 between the fingers 66 at one end of the bar is aligned with one of the lugs 54 as shown in Fig. 5. The bar then is moved with the accompanying longitudinal member 34 preferably snapping past the projections 64 and into the space adjacent the terminations 62 and behind the fingers 66. As the divider bar 56 snaps into engagement in this manner, the cam surfaces of the projections 64 may bear against the longitudinal members 34 and cause the fingers 66 temporarily to deflect slightly outwardly. Return of the fingers to their initial position tends to trap the longitudinal rod or member 34 between the fingers and terminations 62, and above the projections 64 to aid in holding the divider on the rack. It will be observed that the projection and fingers also retain the divider frictionally on the rack.

The opposite end of the divider bar 56 is aligned with the opposite lug 54. This opposite end is forced down from the solid line position shown in Fig. 4 to the dashed line position shown therein and snaps into place about the opposite lug 54 and the longitudinal member 34 on which it is mounted substantially in the same manner as previously described. However, since the members, rods, or wires 34 are spaced apart slightly less than the space between the terminations 62, the longitudinal rods 34 flex out or away from one another slightly to allow the projections 64 on the second end to cam over the associated bar 34 to let the divider bar 56 snap into place. The terminations 62 thereafter preferably exert a slight outward pressure on the bars 34, thereby inhibiting accidental movement of the divider bar from the rack and further preventing the divider bar and rack from rattling against one another. The projections or nubs 64 extend outwardly beneath the longitudinal members 34 to provide the main or primary means holding the divider on the rack. As previously indicated these holding means may be augmented by the resiliency of the fingers 66 and their spacing from the nubs.

With a pair of the divider bars or auxiliary supports 56 installed in the rack 30, a plurality of the trays or pans 32 may be supported. Six such trays or pans may be supported in the illustrative example. The pans 32 are provided with outwardly extending and downwardly projecting or curled over peripheral flanges 68. The edges of these flanges rest on the divider bars 56 as readily may be seen in Figs. 1 and 3, and also on the longitudinal rods 34 where the flanges cross these rods adjacent the ends thereof. The trays further are supported by the humps or inverted U-shaped sections 50 which project upwardly within the flanges adjacent the corners of the trays. As may be seen in Fig. 3 the flanges 68 overlie the fastening means comprising the lugs 54, fingers 66, and projections 64 mounting the divider bars on the longitudinal rods or wires, thus hiding them from view and positioning them where they cannot snag on anything.

In Fig. 1 it will be observed that the fingers 70 of a cook or helper can be inserted beneath the corners of a tray flange 68 while shielded by a folded towel 72 by reaching into the finger clearance space provided by one of the U-shaped end piece sections 52. The tray may be tipped in this manner to insert a spoon 74 or other implement held in the opposite hand 76 beneath the opposite edge of the peripheral flange 68 to lift the tray from the rack 30 and from the drawer 14.

The snapping in place of the divider bars as particularly effected by transverse flexing of the longitudinal members 34 renders the divider bars very convenient in use and makes accidental disassembly most unlikely. The continual force exerted on the longitudinal rods or wires by the divider bars precludes rattling between the parts, while the covering or hiding of the fasteners for the divider bars by the tray flanges provides a neat appearance and a construction wherein snagging or catching is substantially impossible.

The specific example of the invention herein shown and described will be understood as being illustrative of the invention rather than limitative thereof. Structural modifications doubtless will occur to those skilled in the art and will be understood as constituting part of my invention insofar as they fall within the spirit and scope of the appended claims.

I claim:

1. The combination comprising a rack for supporting food pans and the like, and a divider bar cooperable therewith, said rack comprising a pair of longitudinal rods supported substantially in parallelism in spaced apart relation, said longitudinal rods having outward projections thereon, and said divider bar comprising resilient depending means at the opposite ends thereof and cooperating depending means having projections thereon extending generally toward the resilient depending means and spaced therefrom a less distance than the diameter of said longitudinal rods for snapping over said rods, said divider bar having recesses in said resilient means cooperable with said outwardly extending projections for positioning said divider bar on said rack.

2. The combination set forth in claim 1 wherein the divider bar is channel-shaped having flanges connected by a web, the resilient depending portions depend from the end of the web, and the projections extending generally toward said resilient depending means comprise extensions on the flanges near the outer edges thereof.

3. A divider bar for use with a rack having a pair of spaced-apart supporting wires, and comprising an elongated channel-shaped member having a web portion and flanges projecting in the same direction therefrom and disposed in substantially parallel relation, resilient finger means at an end of the web portion and extending substantially at right angles thereto and in spaced opposition to the adjacent ends of said flanges, said finger means having a slot therethrough disposed intermediate the side edges thereof and adapted to receive locating means on the supporting wires, the end portions of the edges of the flanges remote from said web portion being spaced from the adjacent finger means a distance less than the spacing between the finger means and the edges of the flanges adjacent said web portion whereby the finger means will resiliently yield outwardly to passage of the supporting wire past the said end portions of the flanges to its position thereabove.

References Cited in the file of this patent

UNITED STATES PATENTS

| | | |
|---|---|---|
| 423,181 | Rix | Mar. 11, 1890 |
| 1,665,166 | Graham | Apr. 3, 1928 |
| 2,016,246 | Schilling | Oct. 1, 1935 |
| 2,020,373 | Petzold | Nov. 12, 1935 |
| 2,144,804 | Irwin et al. | Jan. 24, 1939 |
| 2,239,482 | Cocks | Apr. 22, 1941 |
| 2,280,371 | Bishop | Apr. 21, 1942 |

FOREIGN PATENTS

| | | |
|---|---|---|
| 931,758 | France | Mar. 3, 1948 |